Sept. 20, 1927.  
B. T. ANDREN  
1,643,232  
ATTACHING SPRING HANGERS TO THE SIDE BARS OF AUTOMOBILE FRAMES  
Filed June 28, 1926
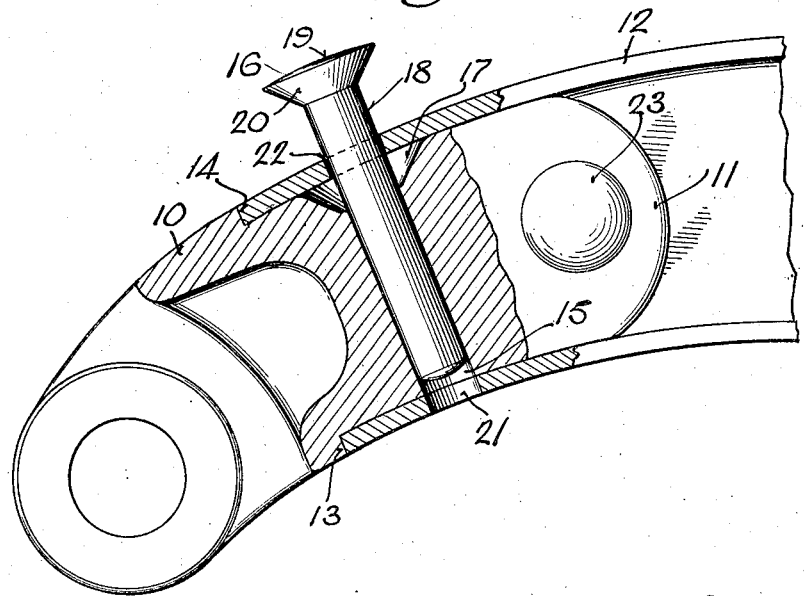
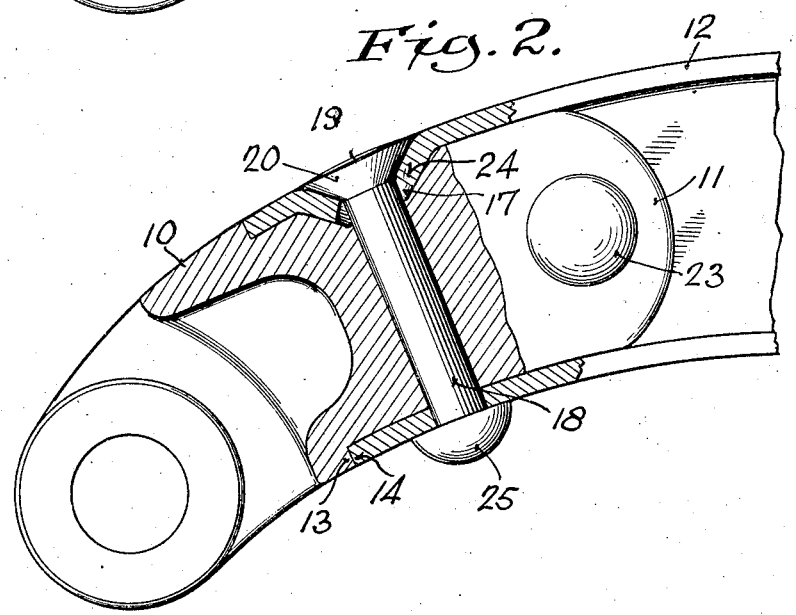
INVENTOR.  
BIRGER T. ANDREN  
BY  
ATTORNEYS.
WITNESS:

Patented Sept. 20, 1927.

1,643,232

UNITED STATES PATENT OFFICE.

BIRGER TORVALD ANDREN, OF MILWAUKEE, WISCONSIN, ASSIGNOR TO A. O. SMITH CORPORATION, OF MILWAUKEE, WISCONSIN, A CORPORATION OF NEW YORK.

ATTACHING SPRING HANGERS TO THE SIDE BARS OF AUTOMOBILE FRAMES.

Application filed June 28, 1926. Serial No. 119,012.

The invention relates to an improved method of attaching spring hangers to the side bars of an automobile frame, and to the combination of a spring hanger and side bar connected in accordance with such method.

In the prevailing methods of connecting spring hangers to side bars a headed rivet is used, the head of the rivet standing above the surface of the side bar and so acting in some degree to detract from the symmetry of the finished article. My invention is designed to eliminate that objection, and I achieve the result desired by insetting the head of the rivet so that the outer surface of the same will be flush or substantially flush with the plane of the outer surface of the side bar.

I have found that by counter-sinking the rivet hole in the spring hanger and forcing the adjacent metal of the side bar which is immediately under the head of the rivet into the said hole, that the thickness of the metal of the side bar is preserved and the very desirable results flowing from the use of counter-sunk rivets can be attained by a simple procedure.

By thus deflecting the metal of the side bar into the counter-sunk hole in the spring hanger, a substantial conical embossment is formed upon the side bar, which when entered into the counter-sunk hole, serves to interlock the assembled parts in position and insure a much more reliable joint between them.

In carrying out by invention, I form a rivet with a substantially flat head, but underneath the head the rivet is provided with a tapering or conical section merging into the shank of the rivet. The spring hanger and the side bar are provided with aligned perforations in which the shank of the rivet is inserted, and when pressure is exerted upon the head of the rivet, the tapering section thereon bears upon and deflects the metal of the side bar, and forces it into the counter-sunk hole in the spring hanger. In such operation, the flat head of the rivet is brought into what is approximately the plane of the outer surface of the side bar, so as to lie substantially flush therewith, and present no perceptible projection. The point of the rivet is upset to complete the riveting operation.

The structural features of my invention will now be described, and the novelty thereof pointed out in the appended claims.

In the accompanying drawing:

Figure 1 is a view in elevation from the inside of the forward end of a side bar of an automobile frame and a spring hanger associated therewith, the view being broken out in longitudinal vertical section in the plane of the rivet to show the construction of the parts, with a rivet shown as entering the aligned rivet holes.

Fig. 2 is a like view of the construction showing the position of the parts at the conclusion of the riveting operation.

In the drawing, the numeral 10 indicates a spring hanger, it may be of ordinary construction, having a shank 11 which is entered into the channelled end of a side bar 12, a shoulder 13 upon the spring hanger abutting the squared end 14 of the side bar. The spring hanger is bored in a vertical direction to provide a perforation 15 for the king rivet 16, such perforation being counter-sunk at one end as at 17, for the purposes of my invention. The king rivet 16 has a straight shank 18 and a substantially flat head 19, connected by a conical or tapering portion 20. The opposite flanges of the side bar are provided with rivet receiving perforations 21 and 22, the perforations 15, 21 and 22 being aligned when the parts are assembled with the end 14 of the side bar abutting the shoulder 13 upon the spring hanger 10. Other rivets, of which one indicated 23 is shown, may be passed laterally through the web of the side bar and shank of the spring hanger.

With the spring hanger and side bar assembled as shown in Fig. 1, and the rivet 16 in the aligned perforations, pressure applied to the head of the rivet 16 will force the tapering portion 20 of the rivet against the unsupported surrounding metal of the side bar lying immediately above the counter-sunk hole 17, and deflect the same from the position shown in Fig. 1 to that shown in Fig. 2. Such action produces upon the inner side of the side bar a circular embossment 24, which is thus made to enter the counter-sunk hole 17 in the spring hanger. At the same time, the tapering portion 20 of the rivet fills the hollow opening in the embossment as the latter is being formed, and when the point of the rivet is spread to form the head 25, the circular embossment 24 on the side bar is held immovably in the counter-sunk hole 17 in the spring hanger, and the parts are united into a permanent structure, with the head of the rivet flush or substantially flush with the outer surface of the side bar.

While I have illustrated the invention as applicable to the king rivet, it is obvious that the same procedure may be used in connection with the transverse rivets. In whatever location used, the objectionable outward projection of the rivet heads is obviated, and a smooth and regular contour is produced upon the outer surfaces of the connected side bar and the spring hanger, and a substantial interlocking of the elements of the combination attained at the same time, which latter feature adds greatly to the ability of the structure to resist the strains imposed thereon.

Having thus described my invention, what I claim and desire to secure by Letters Patent of the United States, is:

1. The method of attaching spring hangers to the side bars of an automobile frame, which comprises the steps of providing a spring hanger with a perforation flaring at its end, providing a side bar with registering perforations, assembling the spring hanger and the side bar with the perforations aligned, inserting in the aligned perforations a rivet having a tapering portion between its head and shank, and applying pressure to the head of the rivet to depress the adjacent surrounding portion of the side bar into the flare of the perforation in the spring hanger to interlock the parts, and upsetting the point of the rivet to complete the riveting operation.

2. The method of attaching spring hangers to the side bars of an automobile frame, which comprises the steps of providing a spring hanger with a perforation flaring at its end, providing a side bar with registering perforations, assembling the spring hanger and the side bar with the perforations aligned, forming a rivet with a substantially flat head and a tapering portion between its head and shank, inserting the said rivet in the aligned perforations, applying pressure to the head of the rivet to force the adjacent surrounding metal of the side bar into the flare of the perforation in the spring hanger to interlock the parts and bring the head of the rivet flush or substantially flush with the plane of the outer surface of the side bar, and upsetting the point of the rivet to complete the riveting operation.

3. In an automobile frame, a side bar and a spring hanger attached to the end thereof, the said parts being provided with aligned perforations for the reception of a rivet, the perforation in the spring hanger being flared at one end with a conical embossment on the bar entered into the flare of the perforation in the spring hanger to interlock the parts, and a rivet having a tapered portion under its head passed through the perforations with such tapered portion resting in the hollow of the embossment, the point of the rivet being spread to connect the parts into a permanent structure.

4. In an automobile frame, a side bar and a spring hanger attached to the end thereof, the said parts being provided with aligned perforations for the reception of a rivet, the perforation in the spring hanger being flared at one end with a conical embossment on the bar entered into the flare of the perforation in the spring hanger to interlock the parts, and a flush rivet having a tapered portion under its head passed through the perforations with such tapered portion resting in the hollow of the embossment and its flush end lying in the plane of the outer surface of the side bar, the point of the rivet being spread to connect the parts into a permanent structure.

In testimony whereof, I have signed my name at Milwaukee, this 11th day of June, 1926.

B. T. ANDREN.